US008527371B2

(12) United States Patent
Aoyama et al.

(10) Patent No.: US 8,527,371 B2
(45) Date of Patent: Sep. 3, 2013

(54) SYSTEM AND METHOD FOR DISTRIBUTION CHAIN MANAGEMENT

(75) Inventors: Keisuke Aoyama, Dallas, TX (US); Kojiro Toyoshima, Dallas, TX (US); Yoshitaka Ezaki, Chyoda-ku (JP)

(73) Assignee: Mitsui Bussan Logistics, Inc., Dallas, TX (US)

( * ) Notice: Subject to any disclaimer, the term of this patent is extended or adjusted under 35 U.S.C. 154(b) by 1822 days.

(21) Appl. No.: 10/798,505

(22) Filed: Mar. 11, 2004

(65) Prior Publication Data

US 2004/0172341 A1    Sep. 2, 2004

Related U.S. Application Data

(62) Division of application No. 10/246,125, filed on Sep. 18, 2002, now abandoned.

(51) Int. Cl.
*G06Q 10/00* (2012.01)
(52) U.S. Cl.
USPC ............................................................ 705/28
(58) Field of Classification Search
USPC ............................................. 705/10, 28, 7.11
See application file for complete search history.

(56) References Cited

U.S. PATENT DOCUMENTS

| 5,884,300 | A | 3/1999 | Brockman | 707/2 |
|---|---|---|---|---|
| 5,893,076 | A | 4/1999 | Hafner et al. | 705/28 |
| 5,946,662 | A | 8/1999 | Ettl et al. | 705/8 |
| 5,953,707 | A | 9/1999 | Huang et al. | 705/10 |
| 5,974,395 | A | 10/1999 | Bellini et al. | 705/9 |
| 6,006,196 | A | 12/1999 | Feigin et al. | 705/10 |
| 6,148,291 | A | 11/2000 | Radican | 705/28 |
| 6,341,266 | B1 | 1/2002 | Braun | 705/7 |
| 6,351,738 | B1 | 2/2002 | Clark | 705/37 |
| 2001/0034673 | A1* | 10/2001 | Yang et al. | 705/28 |
| 2002/0169657 | A1* | 11/2002 | Singh et al. | 705/10 |

FOREIGN PATENT DOCUMENTS

JP    2002-109002    4/2002

OTHER PUBLICATIONS

Translation of Japanese Office Action (Decision of Rejection) for corresponding Japanese patent application 2004-538480 mailed Sep. 8, 2009; 2 pgs.

* cited by examiner

*Primary Examiner* — Susanna M Meinecke Diaz
(74) *Attorney, Agent, or Firm* — Jackson Walker L.L.P.; Christopher J. Rourk

(57) ABSTRACT

A system for supply chain management is provided. The system includes two or more manufacturer systems receiving order data, such as data identifying goods that have been ordered for each of two or more warehouses, and generating first and second shipment data, such as data identifying the actual amount of goods that were shipped. A warehouse system receives the order data, such as to allow a warehouse operator to make plans for accommodating the order, and the shipment data, such as to notify the warehouse operator of actual amounts of goods that have been shipped. An order controller system generates the order data and receives the shipment data, such as data identifying goods that are being shipped to the order controller system.

11 Claims, 5 Drawing Sheets

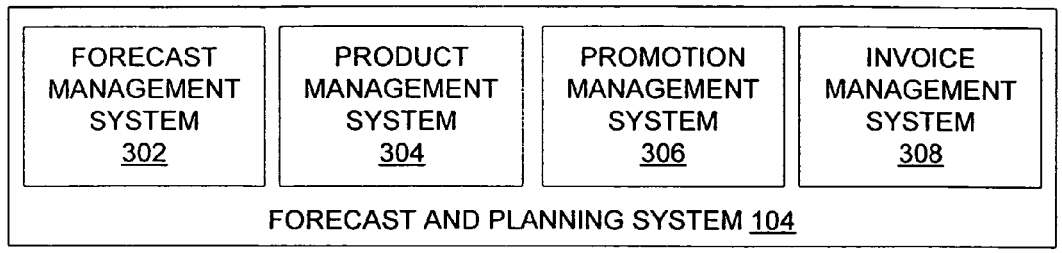
FIGURE 3       300
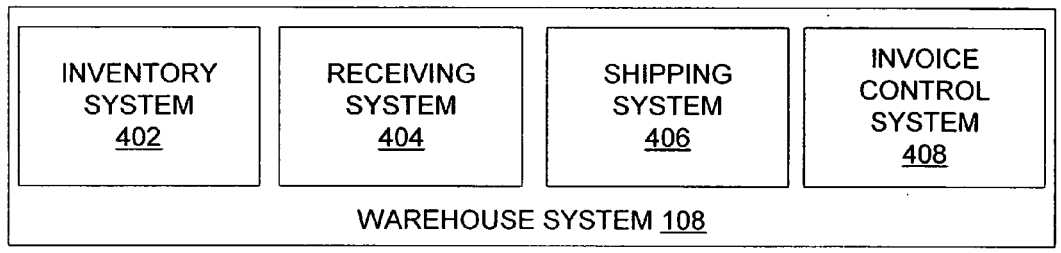
FIGURE 4       400
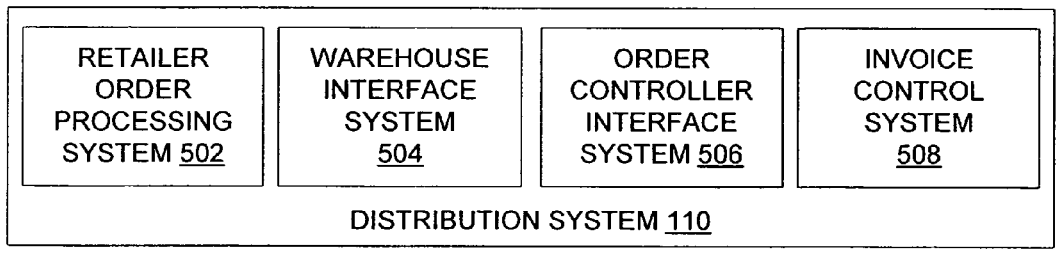
FIGURE 5       500

SYSTEM AND METHOD FOR DISTRIBUTION CHAIN MANAGEMENT

FIELD OF THE INVENTION

The present invention pertains to the field of inventory management. More specifically, the invention relates to a system and method for distribution change management that allows a single entity to control distribution through warehouses controlled by multiple entities.

BACKGROUND OF THE INVENTION

Systems for distribution chain management are known in the art. Such systems include systems that track orders from manufacturers through a warehouse or warehouses that are controlled by a single entity, for distribution to retail locations.

While such systems are useful, they do not support distribution through other than straight distribution chains. Thus, every distribution chain must be modeled as a manufacturer-warehouse-retail store distribution chain.

SUMMARY OF THE INVENTION

In accordance with the present invention, a system and method for distribution chain management are provided that overcomes known problems with existing systems and methods for distribution chain management In particular, a system for distribution chain management is provided that allows architectures other than the manufacturer-warehouse-retail store architecture to be implemented.

In accordance with an exemplary embodiment of the present invention, a system for supply chain management is provided. The system includes two or more manufacturer systems receiving order data, such as data identifying goods that have been ordered for each of two or more warehouses, and generating first and second shipment data, such as data identifying the actual amount of goods that were shipped. A warehouse system receives the order data, such as to allow a warehouse operator to make plans for accommodating the order, and the shipment data, such as to notify the warehouse operator of actual amounts of goods that have been shipped. An order controller system generates the order data and receives the shipment data, such as data identifying goods that are being shipped to the order controller system.

The present invention provides many important technical advantages. One important technical advantage of the present invention is a distribution chain management system that allows warehouses controlled by multiple entities to be coordinated, so as to decrease shipping costs and storage costs, and to improve the ability to take advantage of volume discounts.

Those skilled in the art will appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 3 is a diagram of a system for forecast and planning in accordance with an exemplary embodiment of the present invention;

FIG. 4 is a diagram of a system for providing warehouse management in accordance with an exemplary embodiment of the present invention;

FIG. 5 is a diagram of a system for providing distribution functionality in accordance with an exemplary embodiment of the present invention;

DETAILED DESCRIPTION OF THE INVENTION

Figure 1:
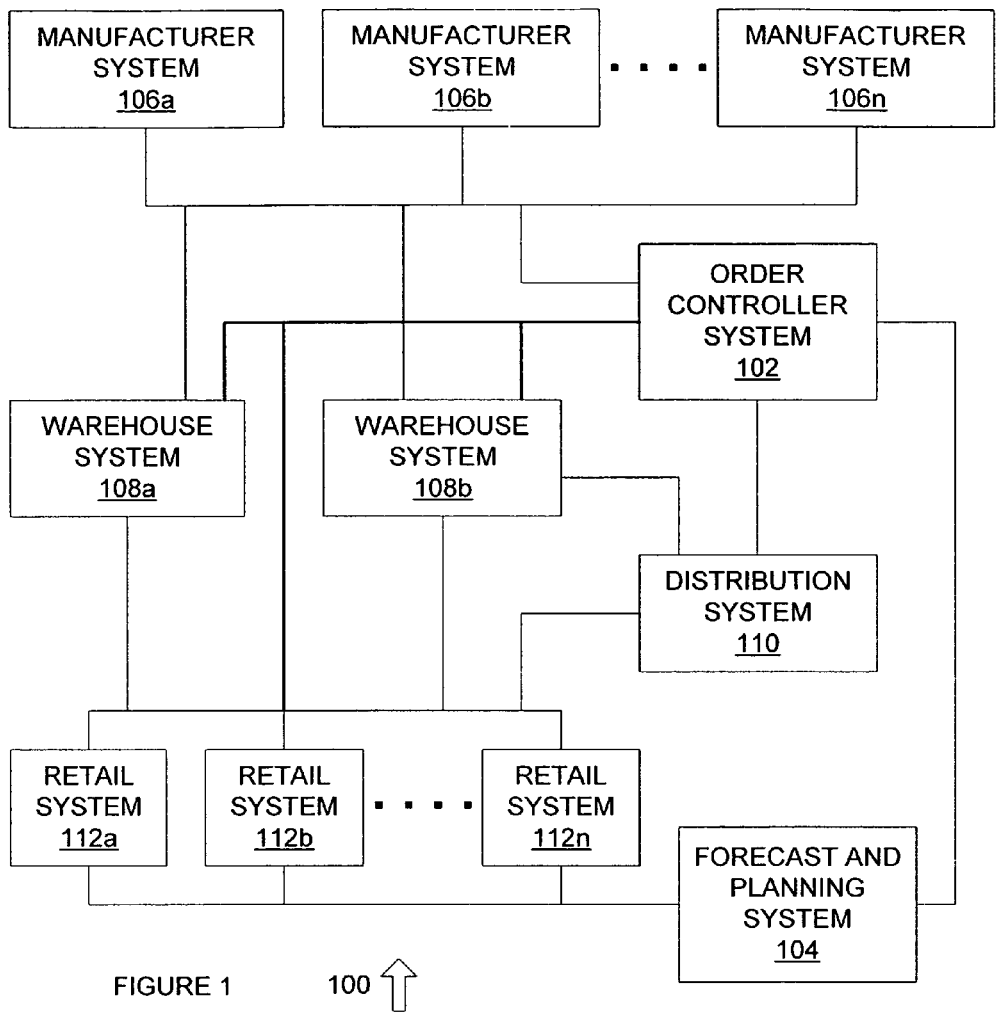
FIG. 1 is a diagram of a system for supply chain management in accordance with an exemplary embodiment of the present invention.

In the description that follows like parts are marked throughout the specification and drawings with the same reference numerals, respectively. The drawing figures are not necessarily to scale and certain features may be shown in somewhat generalized or schematic form in the interest of clarity and conciseness.

FIG. 1 is a diagram of a system 100 for supply chain management in accordance with an exemplary embodiment of the present invention. System 100 allows a supply chain to be managed from an order controller, which generates purchase order data for one or more external warehouses, such as those controlled by unaffiliated organizations, in addition to purchase order data for goods that are processed through an internal warehouse of the order controller.

System 100 includes order controller system 102, forecast and planning system 104, manufacturer systems 106a through 106n, warehouse systems 108a and 108b, distribution system 110, and retail systems 112a through 112n, each of which can be implemented in hardware, software, or a suitable combination of hardware and software, and each of which can be one or more software systems operating on separate general purpose processing platforms. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Order controller system 102 is coupled to forecast and planning system 104, manufacturer systems 106a through 106n, warehouse systems 108a and 108b, distribution system 110 and retail systems 112a through 112n. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. The communications media through which the systems communicate can be a local area network, a wide area network, a public network such as the Internet, the public switched telephone network, a wireless network, a fiber optic network, other suitable media, or a suitable combination of such media.

Order controller system 102 generates order data and transmits the order data to manufacturer systems 106a through 106n and warehouse system 108a and 108b. The order data generated by order controller system 102 includes order data for goods to be shipped to external warehouses associated with each of warehouse systems 108a and 108b, and order data for goods to be shipped to an internal warehouse affiliated with order controller system 102. Order controller system 102 generates the order data in response to data received from warehouse systems 108a and 108b, distribution system 110, retail systems 112a through 112n, and forecast and planning system 104, where these systems do not need to directly generate the order data. In this manner, order controller system 102 can make supply chain management decisions for all entities in the supply chain, where each entity can also or alternatively place orders and order controller system 102 can utilize inventory from such orders for supply chain management.

Warehouse systems 108a and 108b, distribution system 110, retail systems 112a through 112n, and forecast and planning system 104 can also generate independent order data, including but not limited to placing orders with manufacturer systems 106a through 106n, but this independent order data is not reflected in the order data transmitted from order controller system 102 to manufacturer systems 106a through 106n and warehouse systems 108a and 108b. In this regard, any independent order data generated by warehouse systems 108a and 108b, distribution system 110, retail systems 112a through 112n, and forecast and planning system 104 that is separate from the order data generated by order controller system 102 can be used by order controller system 102 to generate order data (either directly or as reflected in inventory data), but is not required to be.

Forecast and planning system 104 generates forecast data, promotion data, product roll-out data, product replacement data, product deletion data, and other suitable data, each of which can be used by order controller system 102 to generate the order data. The forecast data, promotion data, product roll-out data, product replacement data, and product deletion data transmitted from forecast and planning system 104 to order controller system 102 can be used to generate order data for manufacturer systems 106a through 106n, where the order data includes internal order data for shipment of goods to the warehouse affiliated with order controller system 102 and external order data for shipment goods to warehouse systems 108a and 108b.

Order controller system 102 can also receive inventory data from warehouse systems 108a and 108b. In one exemplary embodiment, the inventory data can be obtained locally, such as by manually verifying quantities in a warehouse. Other suitable systems can be used to generate inventory data locally, such as systems that track inventory as it is added to and taken from storage locations in the warehouse. In addition, order controller system 102 can receive inventory data from distribution system 110. In one exemplary embodiment distribution system 110 can be used to assemble goods for delivery to retail locations associated with retail systems 112a through 112n, such that long term storage is not typically provided by distribution system 110. Nevertheless, distribution system 110 can be used in conjunction with promotions, product roll-out, product deletion, or other functions to provide storage on a short-term basis, such as for several days or weeks. Order controller system 102 receives such inventory data from distribution system 110.

Order controller system 102 can also receive data that is used to imply inventory levels. In one exemplary embodiment, order controller system 102 can receive purchase order data, point-of-sale data, and write-off or loss data from each of retail systems 112a through 112n, such that order controller system 102 can estimate inventory levels or imply inventory levels at each of those retail locations, in addition to or instead of receiving locally compiled inventory data. Likewise, distribution system 110 can provide receiving data, shipping data, and write-off or loss data to order controller system 102 so that inventory levels at distribution system 110 can be determined, in addition to or instead of receiving locally compiled inventory data. Warehouse systems 108a and 108b can also provide such receiving data, shipping data, and write-off or loss data to order controller system 102, in addition to or instead of receiving locally compiled inventory data.

Order controller system 102 can also receive shipping data from manufacturer systems 106a through 106n, from warehouse systems 108a and 108b and from distribution system 110, such that order controller system 102 can map an accurate status of all goods in transit, in storage, or for sale. In this manner, order controller system 102 can facilitate functions such as reallocation of shipments in transit, reallocation of goods between warehouse systems 108a and 108b and internal warehouse systems of order controller system 102, and other suitable functions.

Order controller system 102, warehouse systems 108a and 108b, and distribution system 110 can also process order data from retail systems 112a through 112n and generate shipping data. In one exemplary embodiment, retail systems 112a through 112n can have predetermined processes for placing orders for certain items from order controller system 102, for other items from warehouse systems 108a and 108b, and for another class of items from distribution system 110, can provide the order data through forecast and planning system 104, can provide all order data to order controller system 102 which can then allocate the order data to warehouse systems 108a and 108b and distribution system 110, or other suitable processes can be performed to process the retail order data.

In operation system 100 provides comprehensive supply chain management from a plurality of manufacturers through a plurality of warehouse systems and one or more distribution systems, to a plurality of retailers. System 100 allows supply chain management processes to be performed by an order controller system 102, such that goods provided to retail systems 112a through 112n can be improved to provide the lowest price and to maintain inventory quantities at retail locations within target values. System 100 allows two or more unrelated warehouse facilities to be coordinated so as to provide goods to a plurality of retail locations in a cost effective manner.

For example, system 100 allows warehouse facilities having large quantities of retail products that have been purchased at discount in bulk to be coordinated, so as to realize lower ultimate prices for such retail products. Likewise, system 100 allows deliveries to retail locations to be coordinated so as to ensure levels of stock that are not above or below target levels. System 100 also allows items to be readily introduced into retail locations, to be replaced in retail locations, to be deleted from retail locations, or for other functions to be performed.

For example, the operator of a plurality of retail systems 112a through 112n may desire to replace a first type of product with a different brand of that product. System 100 can allow such product replacements to be performed by utilizing existing warehouse system 108a which may have the first brand and warehouse system 108b which may have the second brand, such that existing orders for the first brand at manufacturer systems 106a through 106n can be coordinated with the provision of the second brand by warehouse system 108b. In this manner, existing stock in retail locations can be phased out in a manner that prevents such stock from having to be discarded, priced at a discount, or otherwise disposed of in a cost inefficient manner.

System 100 also allows invoicing to be performed at order controller system 102, warehouse systems 108a and 108b, distribution system 110, or other suitable locations. Forecast and planning system 104 can direct such systems to generate payment data in response to invoice data based on credit balances, debit balances, or other suitable considerations.

Figure 2:
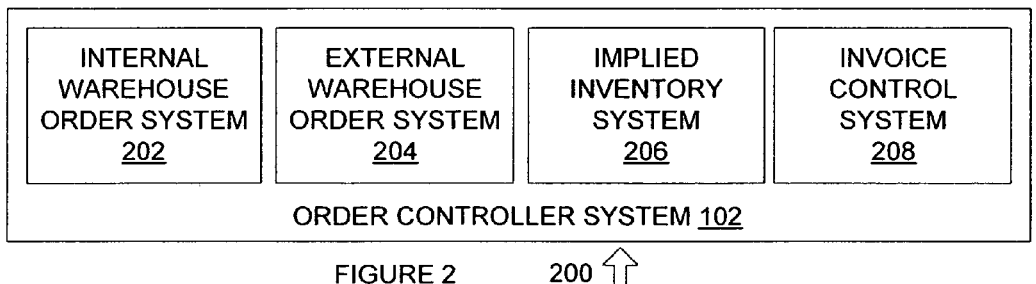
FIG. 2 is a diagram of a system for providing order control in accordance with an exemplary embodiment of the present invention.

FIG. 2 is a diagram of a system 200 for providing order control in accordance with an exemplary embodiment of the present invention. System 200 includes order controller system 102 and internal warehouse order system 202, external warehouse order system 204, implied inventory system 206, and invoice control system 208, each of which can be implemented in hardware, software, or a suitable combination of hardware and software, and which can be one or more software systems operating on a general purpose processing platform.

Internal warehouse order system 202 can receive one or more of order data, inventory data, forecast data, promotion data, product roll-out data, product replacement data, product deletion data, and other suitable data and generates order data for an internal warehouse associated with order controller system 102. In one exemplary embodiment, internal warehouse order system 202 can use one or more supply chain parameters to select optimal order data. For example, warehouse system 108a can have a preexisting obligation to keep predetermined minimum and maximum quantities in stock, and to deliver such quantities to a plurality of retail locations. Forecast and planning system 104 can provide promotion data that would require significantly larger quantities of such goods to be ordered and provided to the plurality of retail locations. Internal warehouse order system 202 can identify volume price discount data for such goods from one of manufacturer systems 106a through 106n, and can place internal orders for the excess quantities such that the price break benefit flows to the operator of order controller system 102. Likewise, other suitable functions can be performed to allocate order data between internal warehouse order data and external warehouse order data.

External warehouse order system 204 can receive one or more of inventory data, forecast data, promotion data, product roll-out data, product replacement data, product deletion data, and other suitable data and generates external warehouse order data. In one exemplary embodiment, the external warehouse order data can be generated to maintain inventory levels at warehouses associated with warehouse system 108a or 108b at predetermined minimum and maximum levels. In another exemplary embodiment, external warehouse order system 204 can receive shipping cost data, such as to reduce shipping cost between manufacturer systems 106a through 106n and retail locations associated with retail systems 112a through 112n. In this exemplary embodiment, a product can be available from a manufacturer at a plurality of locations. External warehouse order system 204 can determine a reduced shipping cost based on the volume price data for each manufacturer system 106a through 106n, warehouse capacity for each of warehouse systems 108a and 108b, shipping volume costs between manufacturer systems 106a through 106n, warehouse systems 108a and 108b and retail systems 112a through 112n, and other suitable factors.

In another exemplary embodiment, external warehouse order system 204 can determine that a preferred order size, such as a truckload, of product delivered to a warehouse system 108a would save a first amount of money, but would overload the storage capacity of warehouse systems 108a. External warehouse order system 204 can then determine whether the additional shipping cost to ship the truckload of goods to warehouse systems 108b would outweigh the benefit obtained from ordering the larger volume, whether goods can be allocated between warehouse systems 108a and warehouse systems 108b, order controller system 102, or distribution system 110 to allow the truckload of goods to be provided to warehouse systems 108a and maintain the predetermined minimum and maximum inventory levels, or can perform other suitable functions. In this manner, external warehouse order system 204 can optimize order data to one or more external warehouses that have preexisting obligations to maintain inventory levels and provide delivery services, so as to reduce the cost of goods including shipping costs, and to increase potential return to the operator of order controller system 102.

Implied inventory system 206 receives shipment data, receiving data, loss data, and other suitable data and generates implied inventory data. In one exemplary embodiment, implied inventory system 206 can receive data from warehouse systems 108a and 108b, distribution system 110, retail systems 112a through 112n, or other suitable systems that shows quantities received at locations, shipped from locations, lost or damaged at locations, or other suitable data, and can use such data to update implied inventory data levels. Implied inventory system 206 can also receive local inventory data, such as from manual counting of inventory levels, and can use such local inventory data to correct implied inventory data, report on discrepancies between implied inventory levels and local inventory levels (such as to indicate where fraud or theft may be occurring), can generate loss or write-off reports showing locations at which unusual levels of losses or write-offs are occurring (such as to indicate management problems, theft or fraud), and can perform other suitable functions.

Invoice control system 208 receives invoice payment data from forecast and planning system 104 and generates payment data for transmission of funds to one or more of manufacturer systems 106a through 106n. In one exemplary embodiment, invoice control system 208 can receive invoice payment data from forecast and planning system 104 and can determine which of warehouse systems 108a and 108b, distribution system 110, or other suitable systems to transmit the invoice payment data to. Other suitable processes can be performed by invoice control system 208.

In operation, system 200 allows supply chain management to be performed from a centralized controller, so as to reduce the cost of ordered goods including costs of shipping, to increase profits, and to ensure that inventory levels at warehouses, distribution centers, retail locations, or other suitable locations are maintained within predetermined limits. System 200 allows the delivery location of the goods to be changed in transit, such as to accommodate promotions, product roll-out, product replacement, product deletion, orders, or other suitable data.

FIG. 3 is a diagram of a system 300 for forecast and planning in accordance with an exemplary embodiment of the present invention. System 300 includes forecast and planning system 104 and forecast management system 302, product management system 304, promotion management system 306, and invoice management system 308, each of which can be implemented in hardware, software, or a suitable combination of hardware and software, and which can be one or more software systems operating on a general purpose processing platform.

Forecast management system 302 provides forecast data to order controller system 102 based on sales data received from retail systems 112a through 112n. In one exemplary embodiment, forecast management system 302 can also receive season data, temperature data, regional variables data, or other suitable data, and can use such data to generate the forecast data. For example, forecast management system 302 can receive temperature data and season data indicating that temperatures are going to become colder, and can use such data to forecast a greater need for hot foods and hot drinks. In another exemplary embodiment, forecast management system 302 can receive season data, such as data identifying one or more seasonal events or other suitable events, and can generate forecast data for goods that may be purchased at higher volumes during such seasons. In this exemplary embodiment, forecast management system 302 can also use regional data to modify or generate such forecast data. For example, a large percentage of a first demographic group may typically order a first type of holiday good, whereas in a second geographical region, a different type of holiday good may be ordered by a different demographic group. Forecast management system 302 allows forecast data to be generated and transmitted to an order controller system 102 or other suitable locations so that purchase decisions for such goods can be made sufficiently in advance of such needs to allow the orders to be placed and for the goods to be obtained at optimal cost.

For example, forecast management system 302 can include order lead time data that is provided from manufacturer systems 106a through 106n, which provides price break data associated with lead times for orders. In this exemplary embodiment, forecast management system 302 can provide forecast data so as to realize price savings that offset potential losses from ordering too many of such goods. In another exemplary embodiment, forecast management system 302 can be implemented within order controller system 102 or other suitable systems.

Product management system 304 generates product roll-out data, product replacement data, product deletion data, or other suitable product data. In one exemplary embodiment, product management system 304 can be used to introduce or roll-out a new product to a plurality of retail locations. Such product roll-out data can be for all retail locations, retail locations in a certain geographical area, or based on other suitable criteria. Product management system 304 can include shelf space functionality that determines optimal shelf space placement. In this exemplary embodiment, product management system 304 can determine whether existing shelf space exist at retail locations for a product that is being rolled-out, whether other products will need to be replaced or deleted to make space for the rolled-out product, or other suitable functions.

Product management system 304 can also generate product replacement data such as in response to replacement of a first product with a different brand of that product, replacement of the first product with a different package configuration for that product, or other suitable processes. Such product replacement data can be generated to identify one or more retail locations at which the product is being replaced, such as to prevent such retail locations from having to stock multiple brands of the same product, multiple package configurations of the same product, or other situations that may adversely affect marketing.

Product management system 304 can also generate product deletion data, such as to delete products to make shelf space for other products that are being rolled-out, to delete products that have not been commercially successful, and other suitable data. Such deletion data can be coordinated with retail locations so as to allow the retail locations to delete product in a manner that is coordinated with preexisting inventory levels at warehouse systems 108a and 108b, manufacturing order commitments, or other suitable data. Product management system 304 can also provide data to order controller system 102 that allows order controller system 102 to determine the optimal product roll-out, product replacement, product deletion, or other suitable functions. Likewise, in one exemplary embodiment, product management system 304 can be implemented within order controller system 102 or other suitable systems.

Promotion management system 306 generates promotion data and transmits the promotion data to order controller system 102. In one exemplary embodiment, promotion data can include data that identifies increased sales targets based on advertising campaigns, coupons that will be distributed, and other suitable data. Promotion management system 306 thus provides forecast data or other suitable data to order controller system 102 that allows additional quantities to be ordered to avoid an out-of-stock condition at retail locations. Promotion management system 306 can also provide invoice data to order controller system 102 or other suitable systems, such as where the promotion has been coordinated in advance with one or more manufacturer systems 106a through 106n, where the manufacturer is providing the incentive, coupon, advertising, and can perform other suitable functions.

Invoice management system 308 provides invoice payment data to order controller system 102, warehouse systems 108a and 108b, distribution system 110, or other suitable systems. In one exemplary embodiment, invoice management system 308 can generate invoice payment data based on preexisting obligations of parties, optimal payment data, credit data, or other suitable data, so as to reduce the cost of goods. For example, invoice management system 308 can coordinate credit facility data with invoice payment data, such as where a credit facility is used to accommodate the lag between when payment is due to manufacturer systems 106a through 106n and the time when proceeds are received from retail systems 112a through 112n.

In operation, system 300 allows forecast and planning to be performed in a system for supply chain management. System 300 can be implemented by an organization for a plurality of retail locations, by a supply chain order controller system, or in other suitable locations or by other suitable systems. In this manner, system 300 allows supply chain management to be improved by decreasing product cost, shipping costs, maintaining predetermined inventory levels in warehouses, distribution centers, retail locations, and other suitable functions.

FIG. 4 is a diagram of a system 400 for providing warehouse management in accordance with an exemplary embodiment of the present invention. System 400 includes inventory system 402, receiving system 404, shipping system 406, and invoice control system 408, each of which can be implemented in hardware, software, or a suitable combination of hardware and software, and which can be one or more software systems operating on a general purpose processing platform.

Inventory system 402 receives local inventory data, implied inventory data, or other suitable data, and provides inventory data to an order controller system 102 or other suitable systems. In one exemplary embodiment, inventory system 402 also tracks minimum and maximum inventory levels, cost allowances for exceeding such minimum or maximum levels, or other suitable data. Inventory system 402 can also generate price discount data, such as where an operator of warehouse system 108a or warehouse system 108b obtains price discounts and wants to provide an incentive for obtaining increased inventory requirements to an operator of order controller system 102. In this exemplary embodiment, warehouse system 108a or warehouse system 108b may be operated by competitors, such that warehouse system 108a may wish to decrease the reliance on warehouse system 108b by offering goods at lower prices to order controller system 102. In this exemplary embodiment, if warehouse systems 108a and 108b each have a minimum and maximum inventory level of X and Y, respectively, warehouse systems 108a may offer to store more than Y units and to decrease the cost per unit of the additional units to order controller system 102 so as to ensure that warehouse systems 108b has inventory maintained at the minimum X unit level. Inventory system 402 can also process purchase order data, such as to generate purchase order data independent of order controller system 102, to accommodate purchase order data received from order controller system 102 in inventory management, or for other suitable purposes. Inventory system 402 can also provide write-off or loss data to order controller system 102. Other suitable processes can also be performed.

Receiving system 404 generates receiving data for goods received from manufacturers. Receiving system 404 can provide the receiving data to order controller system 102 or other suitable systems.

Shipping system 406 provides shipping data to order controller system 102 or other suitable systems. In one exemplary embodiment, shipping system 406 can include shipping time and date data, volume data, an identification of the locations to which the shipment is being made, or other suitable data.

Invoice control system 408 receives invoice payment data, such as from forecast and planning system 104, and generates payment data to one or more manufacturer systems 106a through 106n. In one exemplary embodiment, invoice control system 408 can coordinate with internally generated invoice payment data, so as to allocate costs accordingly to order controller system 102, forecast and planning system 104, or other suitable sources. In this exemplary embodiment, invoice control system 408 can be used to allocate the cost of goods to order controller system 102 or forecast and planning system 104 based upon predetermined price arrangements where a warehouse system 108a or 108b has obtained a bulk discount price from a manufacturer system 106. For example, the operator of warehouse system 108 may have a preexisting commitment to provide goods at a $X per unit to retail locations, based on a cost of $Y per unit from a manufacturer. The operator of warehouse system 108 may then obtain a cost of <$Y per unit from the manufacturer for ordering in larger quantities. Invoice control system 408 can allocate payments to manufacturer systems based on such factors, so as to ensure that the operator of forecast and planning system 104, order controller system 102, or other suitable systems are not given the <$Y per unit cost but rather the $Y per unit cost.

In operation, system 400 allows a warehouse system to control inventory, goods received, goods shipped, and invoicing so as to decrease costs for the warehouse system. System 400 allows inventory levels to be controlled in accordance with preexisting arrangements between parties, and further allows an operator of a warehouse facility to realize cost savings through advantageous ordering quantities or other suitable conditions.

FIG. 5 is a diagram of a system 500 for providing distribution functionality in accordance with an exemplary embodiment of the present invention. System 500 includes distribution system 110 and retailer order processing system 502, warehouse interface system 504, order controller interface system 506, and invoice control system 508, each of which can be implemented in hardware, software, or a suitable combination of hardware and software, and which can be one or more software systems operating on a general purpose processing platform.

Retailer order processing system 502 receives orders from a plurality of retail locations and processes the order data to ensure that goods will be shipped in response to the orders. In one exemplary embodiment, retailer order processing system 502 generates order data for warehouse systems 108a and 108b and order controller system 102, so as to allow shipment of goods to be adjusted based upon actual retail order data.

Warehouse interface system 504 provides purchase order data from retailer locations to one or more warehouses. In one exemplary embodiment, distribution system 110 can be operated by a distribution center that receives goods and assembles or processes them for sale at retail locations without long-term storage. Warehouse interface system 504 can be used to identify quantities of goods that must be obtained from warehouse systems 108a or 108b based on purchase order data received from retail locations associated with retail systems 112a through 112n or other suitable data, so that the raw materials for assembly can be provided to a distribution center associated with distribution system 110.

Order controller interface system 506 provides purchase order data from retailer locations to an order controller. In one exemplary embodiment, distribution system 110 can be operated by a distribution center that receives goods and assembles or processes them for sale at retail locations without long-term storage. Order controller interface system 506 can be used to identify quantities of goods that must be obtained from order controller system 102 based on purchase order data received from retail locations associated with retail systems 112a through 112n or other suitable data, so that the raw materials for assembly can be provided to a distribution center associated with distribution system 110. Order controller interface system 506 also provides storage availability data, inventory data, or other suitable data associated with short term storage capabilities of a distribution facility, such as to facilitate product rollout, product promotions, product replacement, or other functions.

Invoice control system 508 receives invoice payment data, such as from forecast and planning system 104, and generates payment data to one or more manufacturer systems 106a through 106n. In one exemplary embodiment, invoice control system 508 can coordinate with internally generated invoice payment data, so as to allocate costs accordingly to order controller system 102, forecast and planning system 104, or other suitable sources. In this exemplary embodiment, invoice control system 508 can be used to allocate the cost of goods to order controller system 102 or forecast and planning system 104 based upon predetermined price arrangements.

In operation, system 500 allows a distribution center to manage ordering, assembly, shipping, and payment for goods shipped to retail locations. System 500 allows the amount of time that goods are being held by a distribution to be reduced, and also allows temporary storage facilities at distribution centers to be utilized wherein necessary.

Figure 6:
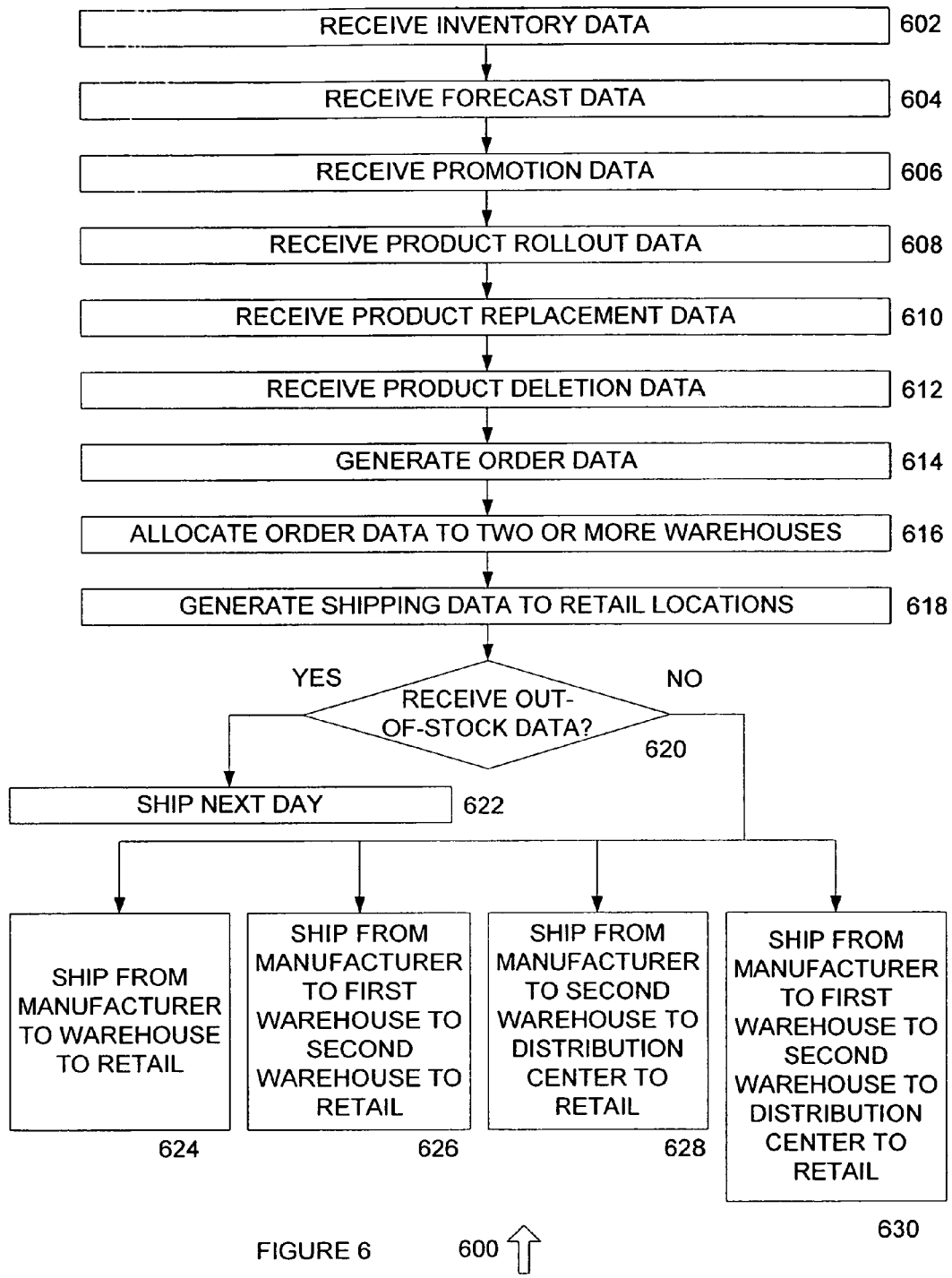
FIG. 6 is a flowchart of a method for supply chain management in accordance with an exemplary embodiment of the present invention.

FIG. 6 is a flowchart of a method 600 for supply chain management in accordance with an exemplary embodiment of the present invention. Method 600 allows an order controller or other suitable systems to control supply chain management in a system where multiple independent warehouse facilities can be used.

Method 600 begins at 602 where inventory data is received. The inventory data can include local inventory data, implied inventory data, or other suitable inventory data. The method then proceeds to 604.

At 604 forecast data is received. Forecast data can include data derived from moving averages of previously sold quantities from retail locations, forecast data derived from regional factors, seasonal factors, temperature factors, or other suitable forecast data. The method then proceeds to 606.

At 606 promotion data is received. In one exemplary embodiment, the promotion data can identify types of goods for which an advertising campaign is being provided, the types of incentives being provided such as discounts or manufacturers coupons, increased quantities that should be provided to compensate for increased demand generated through the promotional campaign, or other suitable promotional data. The method then proceeds to 608.

At 608 product roll-out data is received. In one exemplary embodiment, the product roll-out data can identify one or more regions, products, locations, or other suitable data at which new product will be rolled-out. The product roll-out data can also include a replacement time schedule, such as identifying targets for rolled-out products. The method then proceeds to 610.

At 610 product replacement data is received. In one exemplary embodiment, the product replacement data can identify a different brand for an existing product, a different package configuration for an existing product, or other suitable product replacement data. The product replacement data can also include a replacement time schedule, such as identifying targets for replacement product. The method then proceeds to 612.

At 612 product deletion data is received. The product deletion data can identify target dates for deletion of products from stores, a sequence of stores from which the products are to be deleted, a sequence of regions from which the products are to be deleted, or other suitable deletion data. The method then proceeds to 614.

At 614, order data is generated. In one exemplary embodiment, the order data can first be generated to accommodate expected standard sales from retail locations, and then to accommodate the promotion data, product roll-out data, product replacement data, product deletion data, or other suitable data. In this exemplary embodiment, if store locations have not been identified for product roll-out, replacement, or deletion, the order data can be generated based on existing inventory levels, the target for product roll-out, replacement, or deletion, cost data for goods available through manufacturers or from inventory, and other suitable data. The method then proceeds to 616.

At 616, order data is allocated to two or more warehouses. In one exemplary embodiment, the order data can be allocated based upon existing inventory levels and minimum and maximum inventory levels that could be stored at each warehouse. In another exemplary embodiment, the order data can be allocated based on shipping cost and the geographic location of manufacturer facilities and warehouses. Order data can be allocated in other suitable manners. The method then proceeds to 618.

At 618 shipping data is generated to retail stores. In one exemplary embodiment, the shipping data can include cost data, shipping route data, or other suitable data. For example, different potential routes could be available for shipping of a product from a manufacturer to a retail location. The shipping data can be generated at 618 based upon order data, order allocation data to warehouses, inventory data, and other suitable data. The method then proceeds to 620.

At 620 it is determined whether out-of-stock data has been received. In one exemplary embodiment, retail locations can generate out-of-stock data and can provide the out-of-stock data to order controller system 102 or other suitable systems, such as where deliveries from warehouse systems 108a and 108b are made for such out-of-stock goods on a schedule that will not allow the goods to be restocked in a timely manner, or based on other suitable factors. If it is determined that out-of-stock data has been received the method then proceeds to 622 and the goods are shipped, such as before the normal shipping time for such goods from a warehouse. The method then proceeds to 624 through 630 in parallel. Otherwise if it is determined at 620 that out-of-stock data has not been received, the method proceeds directly to 624 through 630.

At 624 through 630 shipment of product to retail locations occurs in parallel as suitable. At 624, product is shipped from the manufacturer to a warehouse to a retail location. In this exemplary embodiment, the shipping occurs from a manufacturer to a warehouse and then it is delivered from the warehouse directly to a retail location using the warehouse arranged delivery facilities.

At 626, product is shipped from a manufacturer to a first warehouse and then to a second warehouse and then to retail location. In this exemplary embodiment, the first warehouse can be a warehouse operated by an order controller system, such as where the cost of shipping through the order controller system warehouse is less, where storage space is unavailable at the second warehouse until a period of time after it would have been delivered from a manufacturer system, or based on other suitable factors.

At 628, the product is shipped from a manufacturer to a warehouse to a distribution center to a retail location. In this exemplary embodiment, the distribution center can be used to provide the goods to retail locations, the distribution center can be used to assemble the product with other products into a final product, or other suitable processes could be used.

At 630, the product is shipped from a manufacturer to a first warehouse and then to a second warehouse and then to a distribution center and then to a retail location. In this exemplary embodiment, shipment to two or more different warehouses can be used in order to optimize cost, availability, or other suitable factors.

In operation, method 600 allows order data to be generated to accommodate forecast, promotions, product roll-out, product replacement, product deletion, inventory levels, orders, out-of-stock conditions, or other suitable factors. Method 600 allows supply chain management to be performed from a centralized location in a manner that reduces out-of-stock conditions, reduces prices for cost of goods, and performs other suitable functions.

Figure 7:
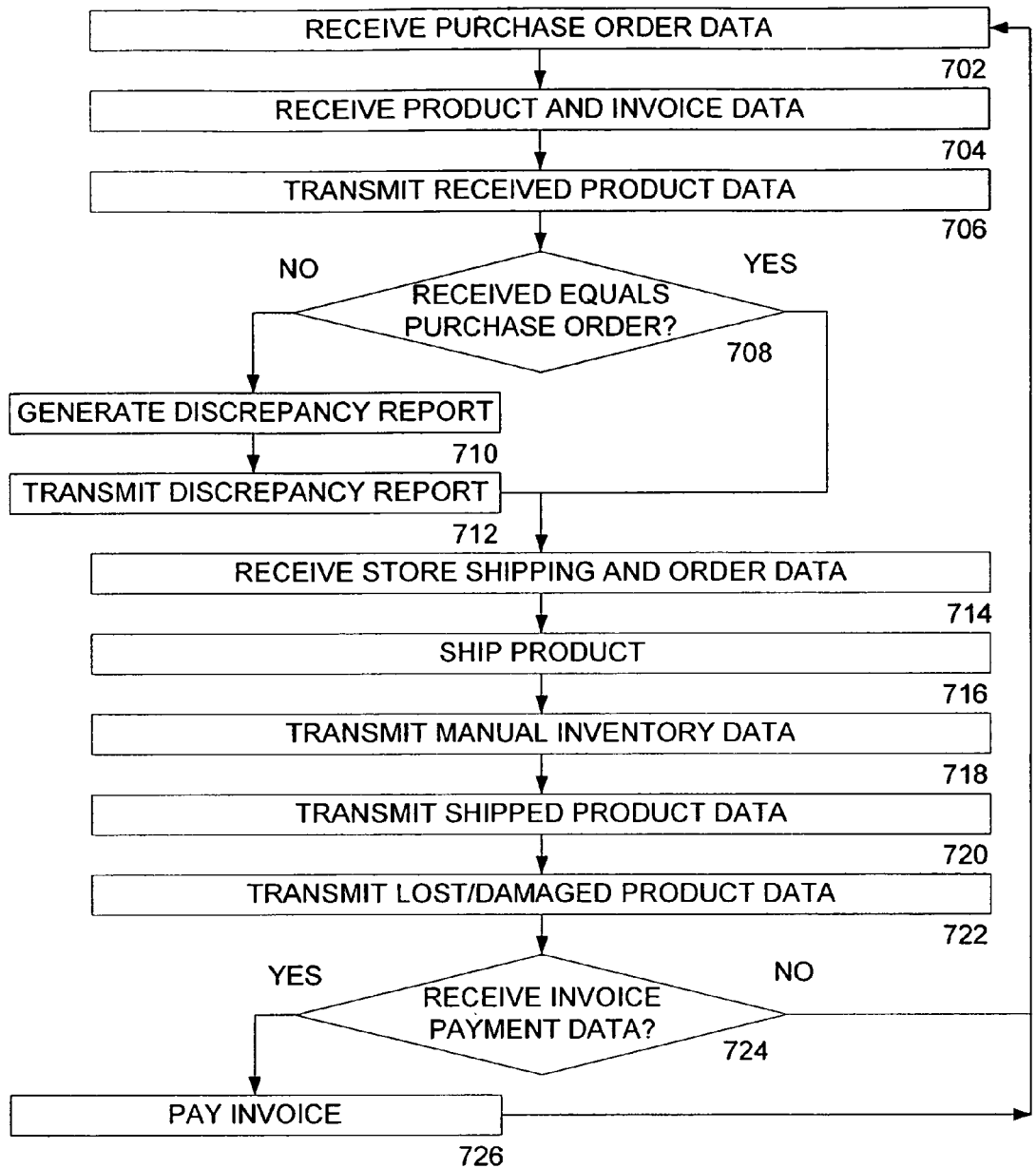
FIG. 7 is a flowchart of a method for processing data at a warehouse facility in accordance with an exemplary embodiment of the present invention.

FIG. 7 is a flowchart of a method 700 for processing data at a warehouse facility in accordance with an exemplary embodiment of the present invention. Method 700 allows ordering of products and receiving a shipment of products for warehouse facility to be improved, so as to reduce costs of goods, increase quality, and perform other suitable functions.

Method 700 begins at 702 where purchase order data is received. In one exemplary embodiment, the purchase order data can be received from an order controller or other suitable centralized ordering locations. In another exemplary embodiment, the purchase order data can be received based on ordering for the warehouse that is performed in conjunction with obligations to an order controller, a forecast and planning system or other suitable systems. The method then proceeds to 704.

At 704 product is received and invoice data is received. In one exemplary embodiment, the product can be received with invoice data. Likewise, the invoice data can be transmitted in advance of the product being received, and a delivery time and other suitable data can be provided with the invoice data. The method then proceeds to 706.

At 706 received product data is transmitted. In one exemplary embodiment, the received product data can include a verification of the actual quantities received, the time at which an invoice shipment was received, or other suitable data. The method then proceeds to 708.

At 708 it is determined whether the received quantity equals the amount on a purchase order or invoice. If it is determined that the received quantity equals the purchased order or invoice quantity, then the method proceeds to 714. Otherwise the method proceeds to 710 where a discrepancy report is generated. In one exemplary embodiment, the discrepancy report can include loss or write-off data, such as identifying product that was damaged in transit, product that was damaged during the process of receiving or other suitable data. The method then proceeds to 712 where a discrepancy report is transmitted, such as to an order controller, or other suitable locations. The method then proceeds to 714.

At 714 store shipping and order data is received. In one exemplary embodiment, the store shipping and order data can be retail location order data and retail location shipping data that identifies the amounts that were shipped to a retail location, the amounts that were ordered by the retail location or other suitable data. The method then proceeds to 716.

At 716 the product is shipped to a retail location. In one exemplary embodiment, the product can be shipped directly, through a distribution center, or in other suitable methods. The method then proceeds to 718.

At 718 local inventory data is transmitted. In one exemplary embodiment, the local inventory data can include a hand count data, data generated automatically by automated inventory systems, or other suitable data. The method then proceeds to 720.

At 720 shipped product data is transmitted. In one exemplary embodiment, ship product data can include products shipped to one or more retail locations, distribution centers, or other suitable locations. The method then proceeds to 722.

At 722 lost or damaged product data is transmitted, such as to a distribution controller. In one exemplary embodiment, the lost or damaged product data can be actual data, it can be inferred based on discrepancies between product that has been shipped to a location and was shipped from a location, or other suitable processes. The method then proceeds to 724.

At 724 invoice payment data is received. In one exemplary embodiment, the invoice payment data can include data that indicates that the invoice should be paid by the operator at the warehouse system. In this exemplary embodiment, the invoice payment data can also include credit data, such as requiring that a credit for the organization be used to pay for the invoice, or other suitable processes. The method then returns to 702.

In operation, method 700 allows a warehouse system to track goods that have been received and shipped, to accommodate purchase order data from third party control organizations, and to perform other processes in a supply chain management system that includes two or more affiliated warehouses. System 700 also allows such warehouse organizations to optimize potential revenue by participating in such systems.

Figure 8:
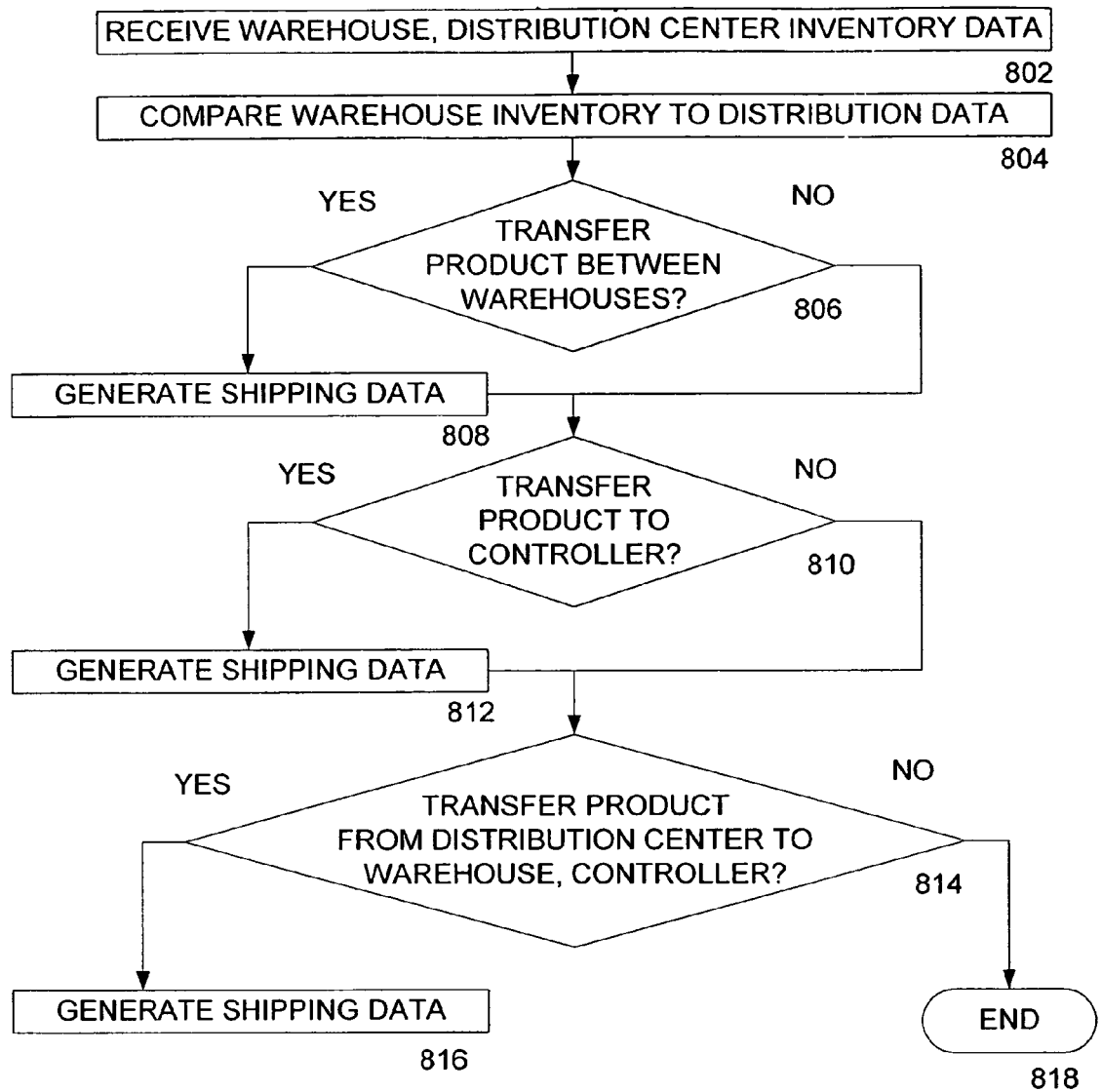
FIG. 8 is a flowchart of a method for reverse logistics in accordance with an exemplary embodiment of the present invention.

FIG. 8 is a flowchart of a method 800 for reverse logistics in accordance with an exemplary embodiment of the present invention. Method 800 allows an order controller and a supply chain management system to use reverse logistics to optimize the cost of goods, shipping costs, to accommodate promotions, product rollout, product deletions, product replacements, or to perform other suitable functions.

Method 800 begins at 802 where warehouse and distribution center inventory data are received. In one exemplary embodiment, warehouse data can include actual or implied inventory levels, inventory minimum and maximum levels, and other suitable data. Distribution center inventory data can include available short-term inventory space data, actual inventory data, implied inventory data, or other suitable data. The method then proceeds to 804.

At 804 warehouse inventory data and distribution inventory data is compared. The method then proceeds to 806 where it is determined whether it is necessary to transfer a product between warehouses. In one exemplary embodiment, the transfer of product between warehouses can be performed in order to increase warehouse space at a first warehouse to accommodate a larger shipment than would be able to be accommodated, so as to realize cost savings for the cost of the product. In another exemplary embodiment, product can be transferred between warehouses to accommodate product rollout, product deletion, product replacement, or other suitable functions. If it is determined at 806 that product transfer between warehouses is not required the method proceeds to 810. Otherwise, the method proceeds to 808 where shipping data is generated and transmitted to an appropriate location, such as a warehouse, a shipper, or other suitable locations. The method then proceeds to 810.

At 810 it is determined whether the product needs to be transferred to a controller. In one exemplary embodiment, the operator of the order controller can also include warehouse space that is under the operator's control, so decisions can be made to transfer goods to the operator to realize lower cost of goods shipped or stored at the warehouse, or based on other suitable factors. If it is determined at 810 that product should be transferred to or from the product controller, the method then proceeds to 814. Otherwise, the method proceeds to 812 where shipping data is generated and transmitted to the affected parties. The method then proceeds to 814.

At 814 it is determined whether products should be transferred to a distribution center. In one exemplary embodiment, temporary storage at a distribution center can be used to relieve storage limitations at a warehouse, at the product controller, or in other suitable locations. If it is determined that the product should not be transferred to the distribution center, the method proceeds to 818 and terminates. Otherwise, the method proceeds to 816 and shipping data is generated and transmitted to appropriate parties.

In operation, method 800 facilitates reverse logistics or other suitable processes that are used to optimize storage of product. Method 800 thus allows storage space at warehouse facilities, at an internal warehouse operated by the supply chain management controller, at a distribution center, or at other suitable facilities to be improved so as to facilitate product rollout, product promotion, product replacement, product deletion, decrease cost of goods, or perform other suitable functions.

Having thus described exemplary embodiments of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

What is claimed is:

1. A method for supply chain management comprising:
receiving warehouse inventory data and distribution center inventory data at a first processor and generating reverse logistics data with the processor to modify a distribution of inventory at a first warehouse and a second warehouse;
receiving the reverse logistics data at a second processor operating a first warehouse system and generating shipping data with the second processor; and
receiving the reverse logistics data at a third processor operating a second warehouse system and generating shipping data with the third processor, the first warehouse is operated by an operator of a supply chain management system and the second warehouse is not operated by the operator of the supply chain management system, and priority is given to maintaining predetermined inventory levels at the first warehouse.

2. The method of claim 1 further comprising receiving product promotion data and generating reverse logistics data at the first processor to modify the distribution of inventory at the first warehouse and the second warehouse in response to the product promotion data.

3. The method of claim 1 further comprising receiving product rollout data at the first processor and generating reverse logistics data to modify the distribution of inventory at the first warehouse and the second warehouse in response to the product rollout data.

4. The method of claim 1 further comprising receiving product replacement data at the first processor and generating reverse logistics data to modify the distribution of inventory at the first warehouse and the second warehouse in response to the product replacement data.

5. The method of claim 1 further comprising receiving product deletion data at the first processor and generating reverse logistics data to modify the distribution of inventory at the first warehouse and the second warehouse in response to the product deletion data.

6. The method of claim 1 further comprising receiving inventory data for a plurality of retail locations at the first processor and generating reverse logistics data to modify the distribution of inventory at the first warehouse and the second warehouse based on the inventory data for the plurality of retail locations.

7. The method of claim 6 further comprising receiving product promotion data for a subset of the plurality of retail locations at the first processor and generating reverse logistics data to modify the distribution of inventory at the first warehouse and the second warehouse in response to the product promotion data for the subset of the plurality of retail locations.

8. The method of claim 6 further comprising receiving product rollout data for a subset of the plurality of retail locations at the first processor and generating reverse logistics data to modify the distribution of inventory at the first warehouse and the second warehouse in response to the product rollout data for the subset of the plurality of retail locations.

9. The method of claim 6 further comprising receiving product replacement data for a subset of the plurality of retail locations at the first processor and generating reverse logistics data to modify the distribution of inventory at the first warehouse and the second warehouse in response to the product replacement data for the subset of the plurality of retail locations.

10. The method of claim 6 further comprising receiving product deletion data for a subset of the plurality of retail locations at the first processor and generating reverse logistics data to modify the distribution of inventory at the first warehouse and the second warehouse in response to the product deletion data for the subset of the plurality of retail locations.

11. The method of claim 1 wherein modification of the distribution of inventory at the first warehouse and the second warehouse is accomplished using the first processor to modify shipping data for regularly scheduled delivery vehicles.

* * * * *